United States Patent [19]

Hutto, Jr. et al.

[11] Patent Number: 4,794,755
[45] Date of Patent: Jan. 3, 1989

[54] BACK-UP CONTROL SYSTEM FOR F101 ENGINE AND ITS DERIVATIVES

[75] Inventors: Walter D. Hutto, Jr.; William W. Stockton, both of Cincinnati, Ohio

[73] Assignee: The United States of America as represented by the Secretary of the Air Force, Washington, D.C.

[21] Appl. No.: 49,351

[22] Filed: May 14, 1987

[51] Int. Cl.$^4$ .............................................. F02C 9/28
[52] U.S. Cl. ............................................... 60/39.281
[58] Field of Search ........................... 60/39.281, 243

[56] References Cited

U.S. PATENT DOCUMENTS

| | | | |
|---|---|---|---|
| 3,764,095 | 9/1973 | Schenbeck | 244/77 M |
| 3,905,241 | 9/1975 | Downing et al. | 74/470 |
| 3,937,014 | 2/1976 | Plant | 60/39.281 |
| 4,245,315 | 1/1981 | Barman et al. | 364/431 |
| 4,248,040 | 2/1981 | Kast | 60/39.281 |
| 4,397,148 | 8/1983 | Stockton et al. | 60/243 |
| 4,478,038 | 10/1984 | Crooper et al. | 60/39.281 |
| 4,489,904 | 12/1984 | Soederberg | 244/75 R |

Primary Examiner—Louis J. Casaregola
Attorney, Agent, or Firm—Donald J. Singer; William G. Auton

[57] ABSTRACT

A back-up control system is implemented in a single engine aircraft to provide the inactivation of a faulty primary system and engagement of a secondary system, and thereby provide a means of maintaining controllable flight sustaining thrust. The aircraft's hydromechanical main engine control and its companion pressure and temperature sensors can develop faults which can result in the inability of the engine to deliver flight sustaining thrust. The electronic control contains logic functions which indicate failure of the main engine control when all of the following exists for a minimum of three seconds: (a) the power lever is at a position requesting a level of dry thrust which exceeds a predetermned threshold; (b) core engine speed is below that required to deliver the predetermined level of dry thrust; (c) core engine speed is not increasing; and (d) turbine temperature is beneath the maximum allowable limit. The back-up system is used in conjunction with a three position cockpit switch having "normal", "on" and "standby" positions. In the "normal" position the back-up system is off and must be manually activated by switching to the "on" position. In the "standby" position, the back-up system is automaticlly activated when the necessary conditions occur.

1 Claim, 7 Drawing Sheets

BACK-UP CONTROL SYSTEM FOR F101 ENGINE AND ITS DERIVATIVES

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to control systems used with single engine aircraft, and more particularly to a back-up control system which inactivates a faulty primary control system and maintains controllable flight sustaining thrust with event of control system failures.

The F101 aircraft engine employs a hydromechanical main engine control to provide, at pilot demand, automatic control of core engine functions essential for non-augmented thrust management. All other control features which are not categorized as essential for delivery of minimum acceptable flight sustaining thrust are electronically controlled.

When failure modes develop within the computational section of the hydromechanical main engine control, and its companion pressure and temperature sensors, they can result in the inability of the engine to deliver flight sustaining thrust. It is desirable, particularly in single engine aircraft application, to provide a back-up control system which will allow inactivation of a faulty primary system and engagement of a secondary system which will provide means of delivering controllable flight sustaining thrust.

The task of providing a back-up control system for single engine aircraft is alleviated, to some extent, by the systems of the following U.S. patents, the disclosures of which are incorporated herein by reference:

U.S. Pat. No. 3,764,095 issued to Schenbeck;
U.S. Pat. No. 3,905,241 issued to Downing et al;
U.S. Pat. No. 4,245,315 issued to Barman et al;
U.S. Pat. No. 4,489,904 issued to Soederberg;
U.S. Pat. No. 4,137,707 issued to Wanger; and
U.S. Pat. No. 4,248,040 issued to Kast.

Barman et al disclose an ignition limp home circuit for electronic engine control systems. Various functions of an internal combustion engine are controlled using a programmed microprocessor, which receives information concerning one or more engine-operating parameters such as: manifold absolute pressure, throttle position, engine coolant temperature, air temperature, engine speed, and the like. The limp home circuit permits the engine to function for a predetermined time even after the microprocessor fails, to enable the vehicle to get to a place of repair.

Downing et al disclose an electric flight control system including three or more flight command signal transmission channels. A discriminator prevents a malfunction of any one channel from causing the mechanical output signal to malfunction.

Soederberg shows a mechanism for actuating an auxiliary power source in an aircraft. This source takes the form of a ram-air turbine. Schenbeck shows a multichannel autopilot for aircraft in which the channels are independent so that, if one channel becomes inoperative, the system can still continue to achieve an automatic landing.

Kast and Wanger both disclose an integrated control system for a gas turbine engine. Wanger combines a primary electronic control system with a hydromechanical back-up control system.

While the prior art systems are exemplary, the F101 aircraft engine, as well as its derivatives, have been observed to manifest four specific indications which indicate the failure of the main engine control system. These specific indications are: (a) the power lever is at a position requesting a level of dry thrust which is at or above a predetermined threshold; (b) core engine speed is below that required to deliver the predetermined level of dry thrust; (c) core engine speed is not increasing; and (d) turbine temperature is beneath the allowable limit.

From the foregoing discussion, it is apparent that there currently exists the need for a back-up control system which supports the F101 aircraft engine and its family of derivative engines. The present invention is intended to satisfy that need.

SUMMARY OF THE INVENTION

The present invention is a back-up control system for use with the main control systems of single engine aircraft, particularly the F101 family of aircraft engines. One embodiment of the back-up system uses a back-up control computer whose memory is loaded with four correlation schedules which are used to determine the appropriate signal to send to the torque motor amplifier which controls core engine speed of the F101 aircraft engine. These correlation schedules include: a deceleration schedule, an acceleration schedule, a core governor schedule, and a fuel metering valve schedule.

The deceleration schedule is a correlation between the compressor discharge pressure and the deceleration fuel schedule for the F101 aircraft engine. The back-up computer receives a compressor discharge pressure reading from a sensor and, using the deceleration fuel schedule determines the appropriate output to the torque motor amplifier.

The acceleration schedule is a correlation between the engine core speed (RPM) with an acceleration fuel schedule. The back-up computer receives as an input the engine core speed and, using the acceleration schedule, produces an appropriate output to the torque motor amplifier.

The core governor schedule receives a reading of the power lever angle (in degrees) and outputs the core speed correlated with it to the torque motor amplifier.

The fuel metering valve schedule is simply a correlation between fuel rate $W_F$ and the appropriate command to place the fuel-metering valve in the required position. All of the schedules described above produce outputs that are received by a control logic portion of the back-up system. The control logic portion can be implemented as either a program within the back-up computer, or may be implemented in a logic circuit. The control logic portion uses all inputs to produce an output signal to the torque motor amplifier, which governs the core engine speed when the primary control system is inactive.

The present invention also includes a failure detection logic circuit which is capable of activating the back-up control system and deactivating the main control system when the circumstances so warrant. One embodiment of the present invention uses four specific criteria to determine when the back-up system should be activated. These four criteria include: (a) the power lever is at a position requesting an amount of dry thrust which exceeds a selected threshold level of dry thrust; (b) core engine speed is below that required to deliver the predetermined level of dry thrust; (c) core engine speed is not increasing; and (d) turbine temperature is beneath the allowable limit.

In one embodiment of the invention the back-up system is used in conjunction with a three position cockpit switch having "normal", "on" and "standby" positions. In the "normal" position the back-up system is off and must be manually activated by switching to the "on" position. In the "standby" position, the back-up system is automatically activated when the necessary conditions occur.

It is an object of the present invention to provide an electronically operated back-up control system which will provide basic control of essential core engine functions in the event of failure of the computational section of the main engine control, or a failure in its essential temperature and pressure sensors.

It is another object of the present invention to provide a logic system which will automatically detect a thrust loss causing failure in the primary system hydromechanical control of single engine aircraft.

It is another object of the present invention to display the detection of a thrust loss causing failure in the primary system hydromechanical control.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a back-up control system for use with the main control system of aircraft for use with the main control system of aircraft engines, especially the F101 family of aircraft engines.

Figure 1:
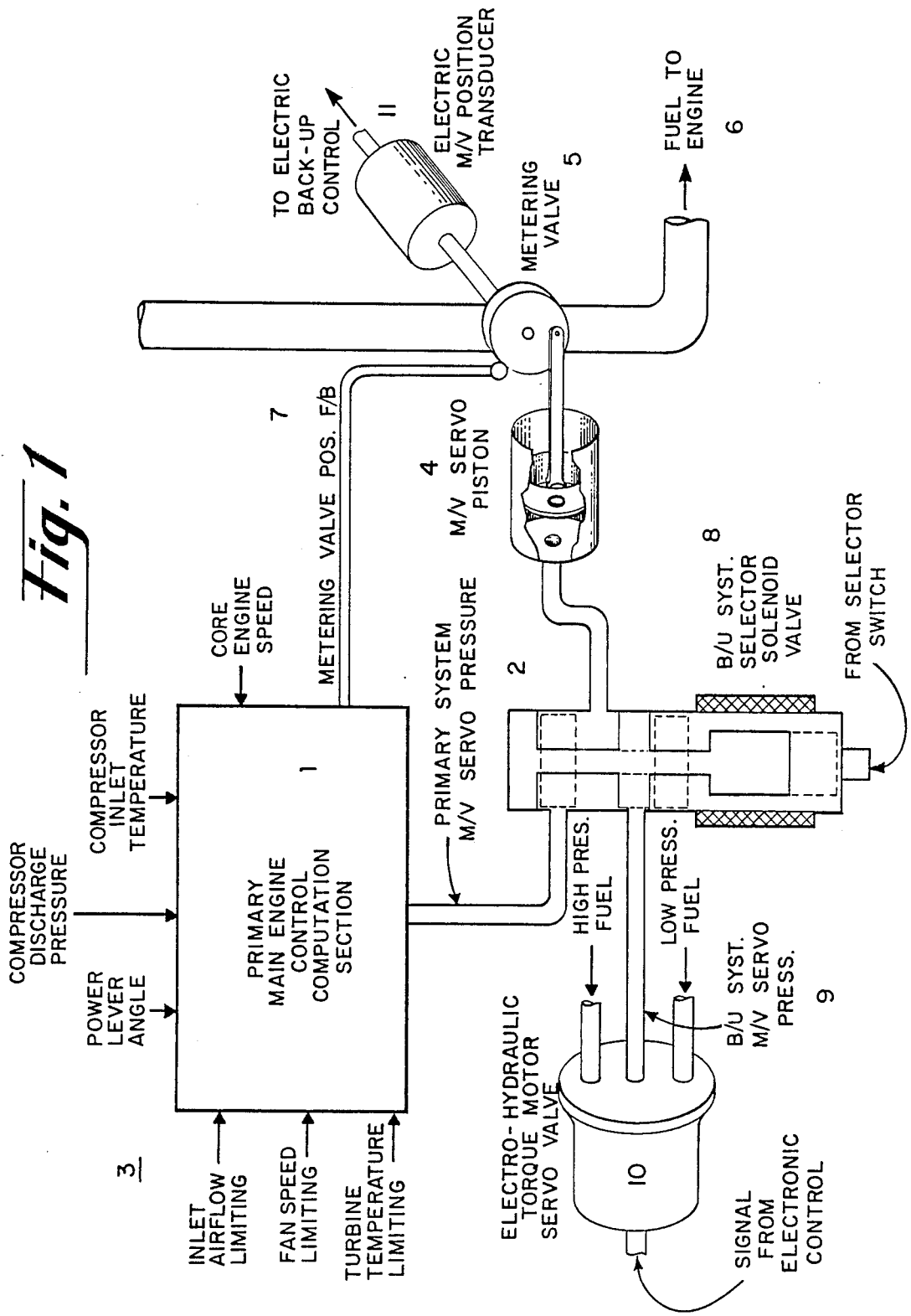
FIG. 1 is a schematic of the main engine control system of the F101 aircraft engine.

The reader's attention is now directed towards FIG. 1 which is a schematic of the main engine control system of the F101 aircraft engine, including a number of elements which provide interaction with the back-up control system of the present invention. As depicted in FIG. 1, the primary main engine control computer section 1 regulates the primary metering valve servo pressure 2 on the basis of the computer inputs 3. The metering valve servo piston 4 responds to the servo pressure to position the metering valve 5 to the position required to deliver the proper fuel flow to the engine 6 dictated by the inputs to the computer section. A metering valve position feedback signal 7 is transmitted to the computer section to null the system when the metering valve is in the position dictated by the computer.

The back-up system of the present invention is activated by energizing the back-up system selector solenoid operated valve 8. In the energized position, the communication path of the primary system metering valve servo pressure 2 to the metering valve servo piston 4 is blocked by the upper land of the selector valve 8. The communication path of the back-up system metering valve servo pressure 9 is simultaneously opened to the metering valve servo piston 4. (This path is blocked when operating in the primary mode). The back-up system metering valve servo pressure is set by the action of a conventional electro-hydraulic torque motor servo valve 10 which is under control of the electronic back-up control computer. An electrical metering valve position feedback transducer 11 provides metering valve position intelligence to the electronic back-up control to null the system, when the metering valve is in the position dictated by the computer. The back-up control electronic computer is powered up and functional during all engine operation. Consequently, it is in control immediately when needed, as described below.

Figure 2:
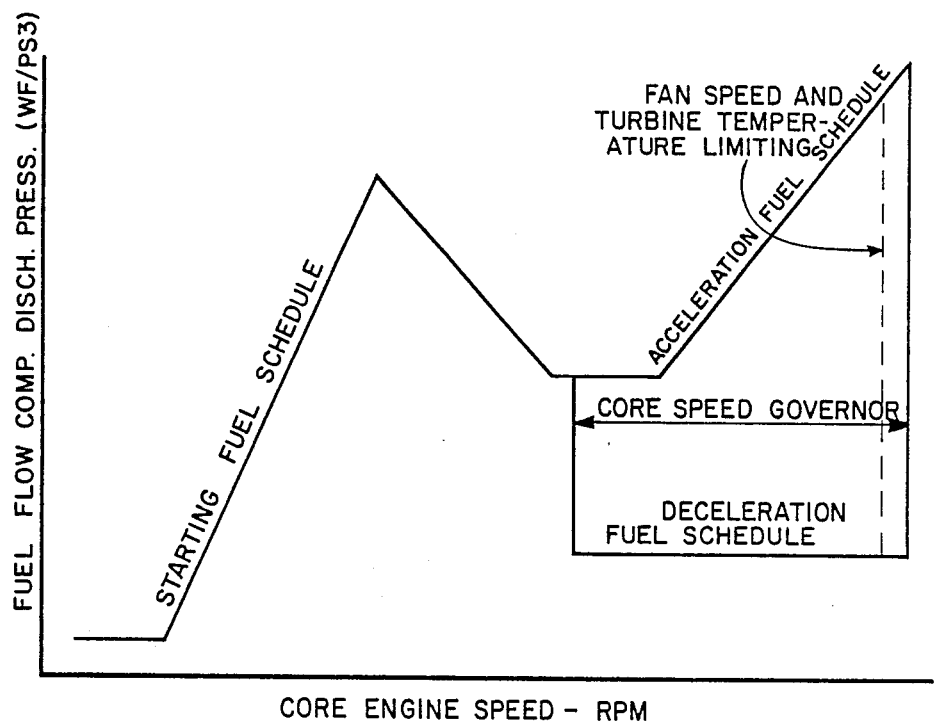
FIG. 2 is a chart which correlates the ideal core engine speed of the F101 aircraft engine with fuel flow and compressor discharge pressure.

FIG. 2 is a chart which correlates the ideal core engine speed of the F101 aircraft engine, with fuel flow and compressor discharge pressure, as indicated by the engine specifications. FIG. 2 is significant because it depicts the manner in which the back-up control system of the present invention is programmed to control the core engine speed in terms of the correlation schedules described earlier.

In FIG. 2, the F101 aircraft fuel flow ($W_F$) is divided by the compressor discharge static pressure ($P_{s3}$) to yield the ratio ($W_F/P_{s3}$) as the variable correlated with ideal core engine speed (RPM). FIG. 2 depicts this correlation for both a starting and an acceleration fuel schedule.

Additionally, a fixed $W_F/P_{s3}$ deceleration fuel schedule and a finitely variable pilot selected core speed governor is also provided. A limiter is provided to override the core speed governor so as to maintain appropriate limits on fan speed and turbine temperature. The limit is set by the most limiting of these three parameters. The back-up system also contains an idle speed override which overrides the idle speed to prevent the compressor discharge pressure ($P_{s3}$) from falling below the minimum pressure required for operation of aircraft systems which are dependent on engine compressor discharge bleed air.

The purpose of FIG. 2 is to describe as accurately as possible the criteria that are used to implement the present invention. The specific values for the F101 aircraft engine are not included in the chart of FIG. 2 since these engine characteristics will change with different aircraft engines. These engine characteristics may also be available from the specifications of the particular engine used.

Figure 3:
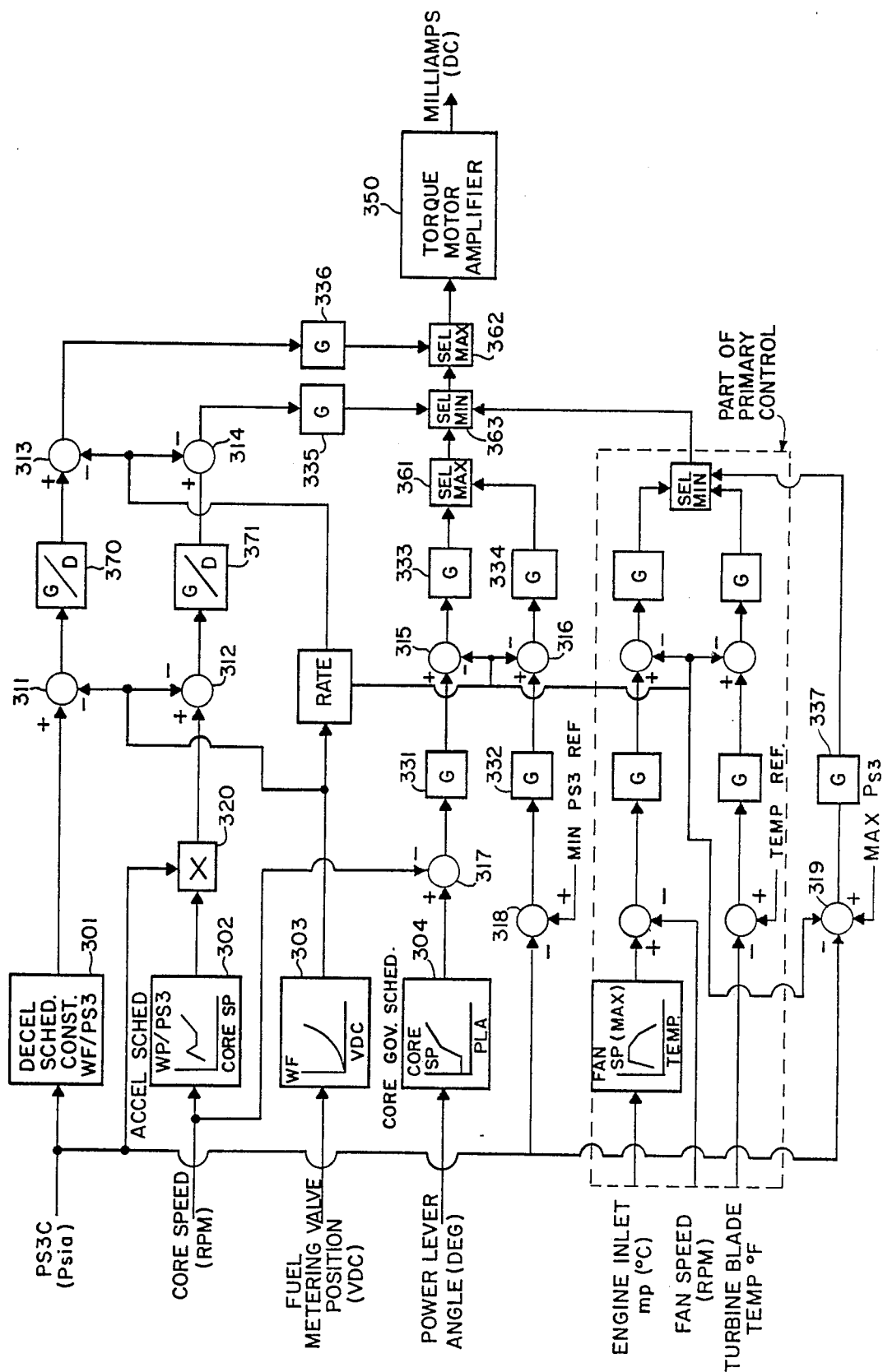
FIG. 3 is a functional block diagram of the control portion of the back-up control system of the present invention.

FIG. 3 is a functional block diagram of the electronic and computational elements of the back-up control system of the present invention. As mentioned above, the back-up control system of the present invention uses a computer whose memory has been loaded with four correlation schedules. The actual computer itself can be selected from any used in the art, and need not be described in further detail. The four correlation schedules of FIG. 3 are: the deceleration schedule 301, the acceleration schedule 302, the fuel metering valve schedule 303, and the core governor schedule 304.

The deceleration schedule 301 is a correlation between the compressor discharge pressure and the deceleration fuel schedule for the F101 aircraft engine. The back-up computer receives a compressor discharge pressure reading from a sensor and, using the deceleration fuel schedule, determines the appropriate output of recommended fuel rate when the engine is decelerating.

The acceleration schedule 302 is a correlation between the engine core speed (RPM) with an acceleration fuel schedule. The back-up computer receives as an input the engine core speed and, using the acceleration schedule, produces an appropriate output of recommended fuel rate when acceleration has been commanded.

The fuel metering valve schedule 303 is simply a correlation between fuel rate $W_F$ and the appropriate command to place the fuel-metering valve in the required position. This correlation should be known for any of the commercially available aircraft engines and in fact is used by the primary control system to deliver the proper fuel flow to the core engine.

The core governor schedule 304 receives a reading of the power lever angle (in degrees) and outputs the core engine speed correlated with it to the torque motor amplifier.

All of the schedules described above produce outputs that are received by a control logic portion of the back-up system. The control logic portion can be implemented as either a program within the back-up computer, or may be implemented in a logic circuit. The control logic portion uses all inputs to produce an output signal to the torque motor amplifier 350 which governs the core engine speed when the primary control system is inactive.

In FIG. 3 the control logic portion of the back-up system is implemented in a logic circuit using nine differencing amplifiers 311–319, a multiplier 320, seven gain amplifiers 331–337, two logic units 361 and 362 which select and output the maximum of two input signals, a logic unit 363 which outputs the minimum of three input signals, two gain plus dynamics amplifiers 370 and 371, and two output registers 359 and 360.

While the control logic circuit of FIG. 3 is depicted as a circuit of logic units, the functions depicted therein could be programmed into the back-up computer. The function of the control logic portion is to control the torque motor amplifier so that the core engine performs ideally (as depicted in FIG. 2) given the different operating conditions indicated by the inputs to the schedules 301–304.

The present invention also includes a failure detection logic circuit which is capable of activating the back-up control system and deactivating the main control system when there exists a detection of a thrust loss producing failure of the primary hydromechanical main engine control. The logic will indicate failure when all of the following exists for a minimum of three seconds (this is to prevent short duration transients from erroneously indicating the presence of faults)

the power lever is at a position requesting a predetermined level of dry thrust which exceeds a predetermined threshold; the core engine speed is below that required to deliver the predetermined level of dry thrust;

the core engine speed is not increasing; and the turbine temperature does not exceed the maximum allowable limit.

The rationale behind this logic is that a thrust loss failure is deemed to exist if the actual engine speed is below the threshold of the pilot requested speed and speed is not increasing toward the requested speed provided the actual engine speed is not below the target speed threshold due to reduction of fuel flow and engine speeds to avoid engine over temperature.

Figure 4:
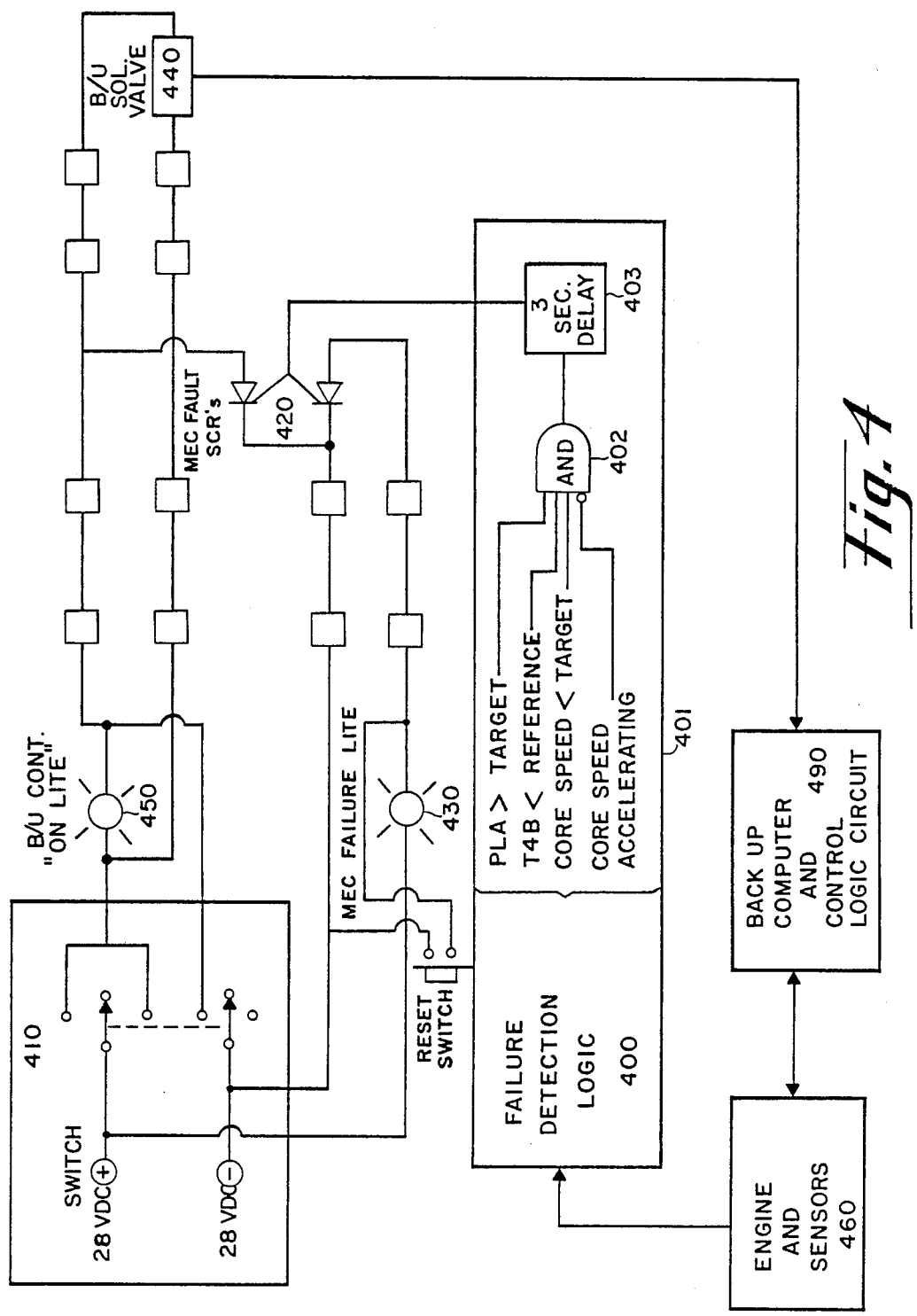
FIG. 4 is a schematic of the failure detect logic circuit of the present invention.

FIG. 4 is a schematic of the failure detect logic circuit as it interconnects with the back-up control system of the present invention. This logic circuit makes a determination as to whether any of the four criteria discussed above are present using inputs from sensors on the F101 aircraft engine. These inputs are: the power lever angle (PLA) as set by the engine operator and as existing in the engine; the turbine temperatures T4B; the engine core speed; and an indication of whether the core speed is accelerating.

Using the four inputs, the failure detect logic circuit 400 performs a comparison to monitor each of these inputs and produce an output signal when these inputs fall outside acceptable operating conditions for a period of greater than three seconds. This failure detect logic circuit comprises; a comparator 401, and AND gate 402; and a three second delay 403.

The comparator 401 performs a comparison on three of the inputs: power lever angle, turbine temperature, and core speed. Additionally, the comparator 401 outputs a signal as long as the core speed is accelerating. The actual power lever angle is compared with the target power lever angle required for dry thrust. When the PLA is less than this target PLA, the comparator 401 outputs a signal on the first of its four outputs. Similarly, the turbine temperature is checked to see if it falls below the maximum allowable limit. As long as it does, this indicates the engine is acceptably running. When the turbine temperature becomes unacceptable, the comparator 401 outputs a second signal on the second of its four outputs.

The actual engine core speed is monitored to determine whether it is below that required to deliver a predetermined level of dry thrust. The comparator 401 makes this comparison to produce the third output signal on the third of its four outputs.

As indicated above, the comparator outputs the fourth signal on its fourth terminal as long as the core speed is accelerating. This fourth signal is received by an inverting input terminal of the AND gate 402 to compare it with the first, second, and third output signals of the comparator 401, which the AND gate receives in three input terminals. When the first three terminals of the AND gate receive a signal and the core speed is not accelerating, the AND gate 401 produces an output signal to the three second delay. As a result, the AND gate 401 reports an unfavorable condition to the three second delay if certain conditions are indicated by the comparator 401. These conditions include: the turbine temperature not exceeding the maximum allowable temperature; the power lever angle is greater than required; and the core engine speed is below that required to deliver the target dry thrust. When these conditions develop, the three second delay 403 waits to see if they persist for more than three seconds before producing an output signal. This three second delay is to prevent transient conditions from triggering an indication of a primary control system failure.

As indicated in FIG. 4, the back-up control system is intended to operate in conjunction with cockpit mounted switches and lights. The cockpit selector switch 410 is a three position switch which can be selected to the "normal", "standby" or "on" positions. In the normal position the back-up control system is inoperative. If the fault detection logic detects a primary control system thrust loss causing fault the silicon controlled rectifier 420 is energized completing the circuit through the fault indication light 430 thereby warning the pilot. The pilot must move the selector switch to the "on" position to turn off the primary control and bring the back-up control into operation. Moving the selector switch to the "on" position completes the circuit through the back-up control selector solenoid valve 440 and the "main engine control inoperative cockpit light 450. The light informs the pilot that he is in the back-up mode.

The "standby" position of the selector switch can be selected at any time, but is primarily intended for critical operational phases such as take-off. In the "standby" position the fault detection logic and selection process occurs as previously described except that energization of the silicon controlled rectifiers in addition to illuminating the fault light also automatically selects the back-up control mode and illuminates the "main engine control inoperative" light.

Figure 5:
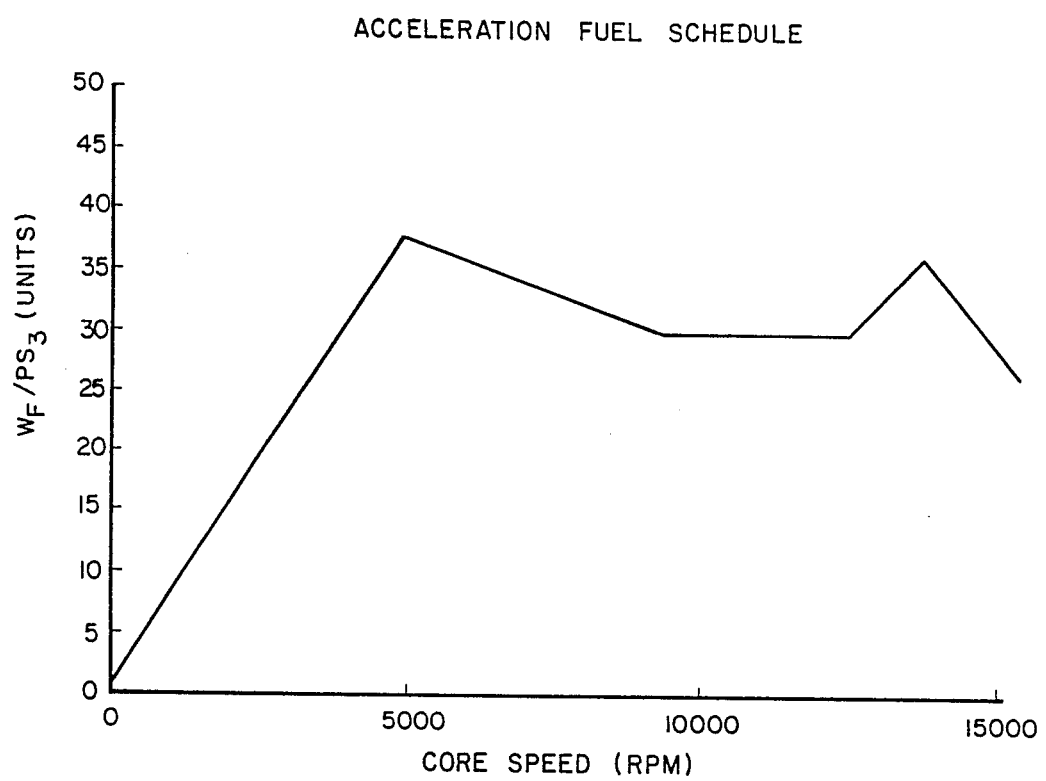
FIG. 5 is a chart depicting the acceleration fuel schedule for the F101 aircraft engine.

FIG. 5 is a chart depicting the acceleration fuel schedule for the F101 aircraft engine. As indicated above, this schedule depicts the required variation in the term "fuel flow ($W_F$) divided by compressor discharge pressure "($P_{s3}$)" or "$W_F/P_{s3}$" versus core engine RPM. The control multiplies the output of this schedule by the actual value of $P_{s3}$ to determine the fuel flow to be delivered to the engine during accelerations of the core engine.

Figure 6:
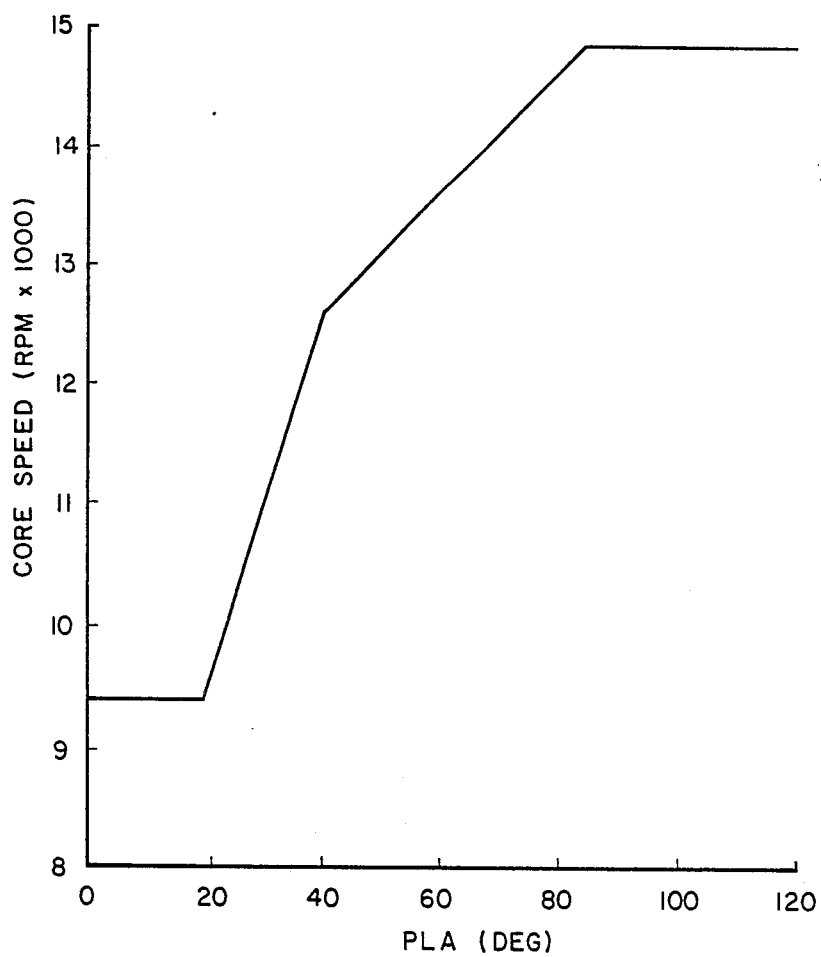
FIG. 6 is a chart depicting the core speed governing schedule, as a function of the power lever angle, for the F101 aircraft engine.

FIG. 6 is a chart depicting the core speed governing schedule, for the F101 aircraft engine, as a function of the power lever angle. This schedule depicts the steady state core speed scheduled versus power lever angle (PLA). The actions of the core speed governor cause fuel flow to be varied such that the core engine will operate at the depicted speed versus PLA.

Figure 7:
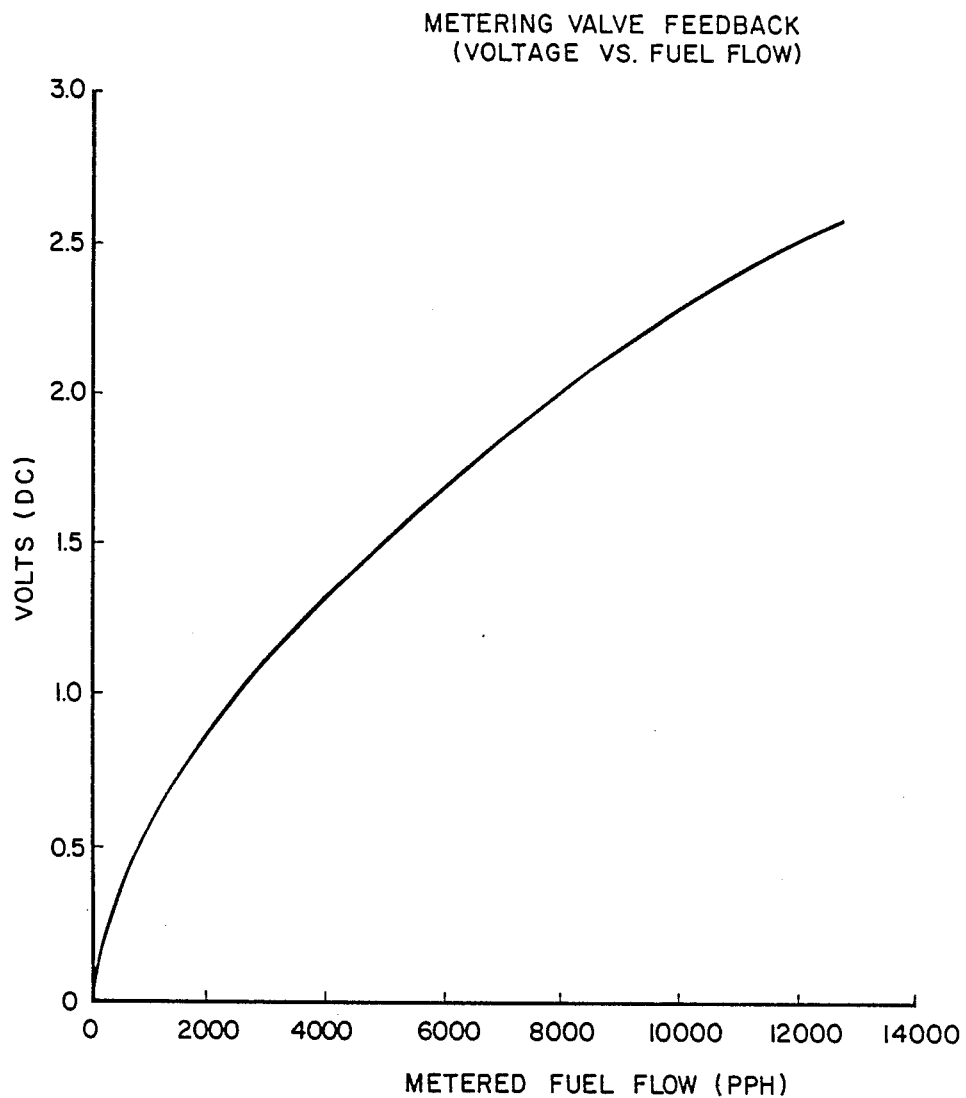
FIG. 7 is a chart depicting the fuel metering valve schedule for the F101 aircraft engine.

FIG. 7 is a chart depicting the fuel metering valve schedule for the F101 aircraft engine. This curve depicts the feedback voltage generated by a rotary variable differential transformer (RVDT) versus actual fuel flow. The RVDT is mechanically connected to and driven by the metering valve. This voltage signal is used by the control as a feedback signal informing the control of the instantaneous actual value of fuel flow.

Note that the present invention, as described above, refers to the deceleration fuel schedule and the turbine blade temperature limiting schedule. There are no curves defining these since they are scheduled at a constant value for all operating conditions. The deceleration fuel schedule holds a constant value of 14 $W_F/P_{s3}$ units while turbine blade metal temperature is limited to 1716° F. at all conditions. As far as this invention is concerned these values could be adjusted to any level desired.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A back-up control system for use with a single engine aircraft powered by a gas turbine engine, said aircraft being controlled by a main control system which activates a servopiston that adjusts a fuel metering valve which controls a flow of fuel to the gas turbine engine, said back-up control system being capable of deactivating the main control system when deteacted faults indicate inadequate control of the gas turbine engine by the main control system, said detected faults including an engine temperature which exceeds a maximum allowable temperature of said gas turbine engine, said back-up control system receiving signals that serve as indications of detected faults from engine sensors which serve as a means for detecting performance characteristics of said gas turbine engine, said performance characteristics including the core engine speed, the gas turbine engine's temperature, an actual power lever angle, and an acceleration signal which indicates if the gas turbine engine's core engine speed is accelerating, said back up control system comprising:

a comparator which is electrically connected with said engine sensors to receive signals therefrom, said signals including a reading of said engine temperature, a reading of said gas turbine engines actual power lever angle, said gas turbine engine's core engine speed, and said acceleration signal which indicates when said gas turbine engine's core engine speed is accelerating in response to acceleration signals commanded by a pilot, said comparator also having a stored set of ideal values including a maximum allowable temperature of said gas turbine engine, power lever angles which are associated with said acceleration signals commanded by the pilot, and target core engine speeds associated with said acceleration signals commanded by the pilot, said comparator outputting a first output signal when said actual power lever angle compares unfavorably with said target power lever angle, said comparator outputting a second output signal when said gas turbine engine's temperature exceeds said maximum allowable temperature, said comparator outputting a third output signal when the actual core engine speed compares unfavorably with the target core engine speed, and said comparator outputting a fourth output signal when said core engine speed is accelerating;

an AND gate having a first, second, third and fourth input terminal which are connected with said comparator to respectively receive said first, second, third and fourth output signals, said fourth input terminal of said AND gate being an inverting input terminal, said AND gate having an output terminal which outputs a fault indication signal;

a delay circuit which is electrically connected with said AND gate and receives said fault indication signal therefrom, said delay circuit outputting said fault output signal when said fault indication signal is continuously reproduced by said AND gate for a duration of about three seconds, said delay circuit thereby reporting an actual condition of faults in said gas turbine engine and avoiding a false report based upon transient conditions;

a back-up computer which receives said inputs from said engine sensors of said gas turbine engine, said inputs including said gas turbine engines actual core engine speed, compressor discharge pressures and turbine temperature, and said measure of the gas turbine engine's power lever angle, said back-up computer having a memory loaded with a plurality of correlation schedules including a deceleration schedule which correlates the compressor discharge pressure with a deceleration fuel schedule for the gas turbine engine to indicate a first recommended fuel rate which the back-up computer outputs as a first output signal, said memory having an acceleration schedule which correlates said actual engine core speed with an acceleration fuel schedule to indicate a second recommended fuel rate which said back-up computer outputs as a second output signal, said memory having a fuel metering valve schedule which correlates said gas turbine engine's actual fuel rate with a position required on its fuel metering valve which said back-up computer uses to produce a rate which it outputs as a third output signal, said memory having a core governing schedule which correlates the power lever angle with the core engine speed, which the computer outputs as a fourth output signal;

a control logic circuit which is electrically connected with said computer and to a torque motor amplifier which drives said gas turbine engine's fuel metering valve, said control logic circuit receiving said first, second, third, and fourth output signals form said computer and producing therefrom an electrical signal which is used by said torque motor amplifier to drive the gas turbine engine's fuel metering valve, said control logic circuit receiving said first, second, third, and fourth output signals from said computer and producing therefrom an electrical signal which is used by said torque motor amplifier to drive the gas turbine engine's fuel metering valve and thereby provide control of said gas turbine engine;

a switch which is electrically connected with said AND gate and said control logic circuit, said switch having a standby setting in which it automatically activates said control logic circuit and deactivates said main control system when said switch receives said fault output signal from said AND gate, and wherein said switch comprises a three-position switch which has a normal position, a standby position, and an on position, said switch electrically connecting aid main control system with said gas turbine engine such that said back-up control system is inactive when said switch is in the normal position, said switch electrically connecting the back-up system with the gas turbine engine and deactivating the main control system when said switch is in the on position, said switch automatically disconnecting the main control system and connecting in its place the back-up control system when it is in the standby position and when it receives said fault output signal from said AND gate;

a means for indicating to a pilot that said detected faults are unacceptable, said indicating means being electrically from said AND gate; and a back-up system selector solenoid operated valve which is activated by said switch, and which connects said control logic circuit to said servopiston which adjusts said fuel metering valve so that said back-up computer controls said flow of fuel to said gas turbine engine when said detected faults indicate inadequate control of the gas turbine engine by the main control system.

* * * * *